US009591828B2

(12) United States Patent
Hampel et al.

(10) Patent No.: US 9,591,828 B2
(45) Date of Patent: Mar. 14, 2017

(54) LIVESTOCK CONFINEMENT PEN

(71) Applicants: Lance T. Hampel, Fredericksburg, TX (US); Edward G. Wolk, Slinger, WI (US)

(72) Inventors: Lance T. Hampel, Fredericksburg, TX (US); Edward G. Wolk, Slinger, WI (US)

(73) Assignee: L.T. Hampel Corp., Germantown, WI (US)

( * ) Notice: Subject to any disclaimer, the term of this patent is extended or adjusted under 35 U.S.C. 154(b) by 127 days.

(21) Appl. No.: 14/289,023

(22) Filed: May 28, 2014

(65) Prior Publication Data

US 2014/0261222 A1 Sep. 18, 2014

Related U.S. Application Data

(60) Continuation-in-part of application No. 13/633,499, filed on Oct. 2, 2012, now Pat. No. 8,973,533, and a
(Continued)

(51) Int. Cl.
| | |
|---|---|
| *A01K 1/00* | (2006.01) |
| *A01K 1/02* | (2006.01) |
| *B29C 51/10* | (2006.01) |
| *B29L 31/00* | (2006.01) |
| *B29C 49/00* | (2006.01) |
| *B29C 51/00* | (2006.01) |

(52) U.S. Cl.
CPC ............. *A01K 1/02* (2013.01); *A01K 1/0035* (2013.01); *A01K 1/0088* (2013.01); *B29C 49/0047* (2013.01); *B29C 51/105* (2013.01); *B29C 49/0031* (2013.01); *B29C 51/006* (2013.01); *B29C 2049/0057* (2013.01); *B29C 2791/006* (2013.01); *B29C 2793/009* (2013.01); *B29L 2031/7126* (2013.01); *B29L 2031/724* (2013.01); *Y10T 156/1002* (2015.01)

(58) Field of Classification Search
CPC ...... A01K 1/02; A01K 1/0035; A01K 1/0088; A01K 1/0047–1/0064
USPC ....... 119/448, 455, 472, 473, 474, 482, 500, 119/502, 512, 513, 514, 515, 521
See application file for complete search history.

(56) References Cited

U.S. PATENT DOCUMENTS

| | | | |
|---|---|---|---|
| 1,330,404 | A | 2/1920 | Sommer |
| 1,594,896 | A | 10/1922 | Mighell |

(Continued)

FOREIGN PATENT DOCUMENTS

GB 2365032 A 2/2002

OTHER PUBLICATIONS

BSM Comfy Calf Suites—Picture From Sep. 4, 2004, Website—www.comfycalfsuites.com.
(Continued)

*Primary Examiner* — Kristen C Hayes
*Assistant Examiner* — Ebony Evans
(74) *Attorney, Agent, or Firm* — Quarles & Brady LLP

(57) ABSTRACT

An indoor livestock confinement system includes a plurality of hollow plastic panels. One of the hollow plastic panels defines a U-shaped door frame. The door frame is open at the top and includes an attachment for a door at one edge. The door frame includes a reinforcement inside the panel that extends across a bottom threshold and sides of the door frame.

5 Claims, 12 Drawing Sheets

Related U.S. Application Data continuation-in-part of application No. 13/464,575, filed on May 4, 2012, now Pat. No. 8,763,561, which is a division of application No. 12/144,197, filed on Jun. 23, 2008, now Pat. No. 8,186,306.

(60) Provisional application No. 61/542,576, filed on Oct. 3, 2011, provisional application No. 60/936,881, filed on Jun. 22, 2007.

(56) References Cited

U.S. PATENT DOCUMENTS

| | | | |
|---|---|---|---|
| 1,669,300 A * | 5/1928 | Hunter | B65D 7/24 |
| | | | 119/498 |
| 3,169,543 A | 2/1965 | McGerty | |
| 3,204,606 A | 9/1965 | Parr et al. | |
| 3,215,118 A | 11/1965 | Behlen | |
| 3,222,237 A | 12/1965 | McKelvy | |
| 3,472,206 A * | 10/1969 | Wendland | A01K 1/0218 |
| | | | 119/503 |
| 3,541,994 A | 11/1970 | Meng et al. | |
| 3,662,712 A * | 5/1972 | Singer | A01K 1/0236 |
| | | | 119/453 |
| 3,754,676 A | 8/1973 | Box | |
| 3,858,555 A | 1/1975 | Smith | |
| 3,968,895 A | 7/1976 | Barnes, Jr. et al. | |
| 3,995,592 A * | 12/1976 | Goldstaub | A01K 1/0218 |
| | | | 119/500 |
| 4,036,177 A * | 7/1977 | DeSmit | A01K 31/005 |
| | | | 119/457 |
| 4,062,322 A | 12/1977 | Dormehl | |
| 4,161,924 A | 7/1979 | Welker | |
| 4,180,176 A | 12/1979 | Galer | |
| 4,292,929 A | 10/1981 | Tellers | |
| 4,478,175 A * | 10/1984 | Fisher | A01K 1/0227 |
| | | | 119/448 |
| 4,517,921 A * | 5/1985 | Haythornthwaite | A01K 1/0047 |
| | | | 119/448 |
| 4,557,091 A * | 12/1985 | Auer | E04B 2/72 |
| | | | 52/282.2 |
| 4,681,302 A | 7/1987 | Thompson | |
| 4,735,173 A * | 4/1988 | Dubreuil | A01K 1/0236 |
| | | | 119/452 |
| 4,819,582 A | 4/1989 | Lichvar | |
| 4,836,143 A | 6/1989 | Shadbolt, Jr. | |
| 4,844,424 A | 7/1989 | Knudslien | |
| 5,036,797 A | 8/1991 | Koozer | |
| 5,107,792 A * | 4/1992 | Bugl | A01K 1/02 |
| | | | 119/448 |
| D338,941 S | 8/1993 | Scott, Jr. et al. | |
| D348,988 S | 7/1994 | Bro et al. | |
| D353,866 S | 12/1994 | Houry et al. | |
| D353,867 S | 12/1994 | Houry et al. | |
| D354,108 S | 1/1995 | Houry et al. | |
| D358,620 S | 5/1995 | Hill et al. | |
| 5,544,870 A | 8/1996 | Kelley et al. | |
| 5,553,569 A | 9/1996 | Street et al. | |
| 5,580,316 A | 12/1996 | Hill et al. | |
| 5,609,327 A * | 3/1997 | Amidon | E04H 17/18 |
| | | | 256/19 |
| 5,758,855 A | 6/1998 | Jordan et al. | |
| D400,264 S | 10/1998 | Striefel et al. | |
| 5,964,190 A * | 10/1999 | Willinger | F24F 7/007 |
| | | | 119/482 |
| 5,967,091 A | 10/1999 | Zartman | |
| 6,059,491 A | 5/2000 | Striefel et al. | |
| 6,105,654 A | 8/2000 | Martel | |
| 6,190,084 B1 | 2/2001 | Ibanez | |
| 6,250,022 B1 * | 6/2001 | Paz | E04B 1/34321 |
| | | | 312/100 |
| 6,294,114 B1 | 9/2001 | Muirhead | |
| 6,383,084 B1 | 5/2002 | McEachen et al. | |
| 6,418,961 B1 | 7/2002 | Edstrom, Sr. | |
| D466,690 S | 12/2002 | Walsh | |
| 6,823,639 B2 | 11/2004 | Hampel | |
| 6,854,426 B2 | 2/2005 | Campbell et al. | |
| 6,945,194 B2 | 9/2005 | Fritsch | |
| 7,111,828 B2 | 9/2006 | Rosine et al. | |
| 7,201,116 B2 * | 4/2007 | Axelrod | A01K 31/08 |
| | | | 119/453 |
| 7,213,368 B1 | 5/2007 | Eliasen | |
| 7,213,374 B2 | 5/2007 | Harris et al. | |
| 7,234,275 B1 | 6/2007 | Haggy et al. | |
| D552,751 S | 10/2007 | Van Buskirk | |
| 7,487,744 B1 * | 2/2009 | Goldberg | A01K 1/031 |
| | | | 119/453 |
| 7,584,720 B1 * | 9/2009 | Jackson | A01K 1/034 |
| | | | 119/452 |
| 7,665,982 B2 | 2/2010 | Lucier et al. | |
| D656,687 S | 3/2012 | VanBuuren et al. | |
| 8,186,306 B2 * | 5/2012 | Hampel | A01K 1/0011 |
| | | | 119/448 |
| 8,763,561 B2 | 7/2014 | Hampel | |
| 8,973,533 B2 | 3/2015 | Hampel et al. | |
| 2002/0025221 A1 | 2/2002 | Johnson | |
| 2002/0166513 A1 | 11/2002 | Van Sluis | |
| 2003/0056907 A1 | 3/2003 | Caveney et al. | |
| 2003/0221633 A1 | 12/2003 | Werde et al. | |
| 2004/0065269 A1 | 4/2004 | Bonner et al. | |
| 2006/0101738 A1 | 5/2006 | Lethers et al. | |
| 2006/0124072 A1 | 6/2006 | Conger et al. | |
| 2008/0296548 A1 | 12/2008 | McDonald | |
| 2011/0100302 A1 | 5/2011 | Van Buuren | |

OTHER PUBLICATIONS

BSM Comfy Calf Suites—Picture From Sep. 23, 2005, Website—www.comfycalfsuites.com.
Fritsch Equipment Corp., Poly Calf Stalls, www.fritschequipment.com/calfstall.html, Printed Nov. 2, 2009.
J&D Manufacturing, Calf Condos and Dairy Stall Systems, www.jdmfg.com/index.cfm?event=pageview&contentPieceID=6714, Printed Oct. 27, 2009.
Brian Llewelyn A'l Ferched, Calf Equipment, www.polaris-sales.co.uk/calf_equipment.htm, Printed Oct. 27, 2009.
Linway Mfg. Co. & Don Themm Enterprises Inc., New Easy-Care Under-Roof Calf Hutch, Brochure Page, Undated.
Blue Diamond Industries, LLC, Cozy Crib Calf Stalls, www.cozycalfcribs.net/stalls.php, Printed Nov. 2, 2009.
United States Patent and Trademark Office, Right of Appeal Notice, U.S. Appl. No. 95/002,136, Oct. 21, 2015.

* cited by examiner

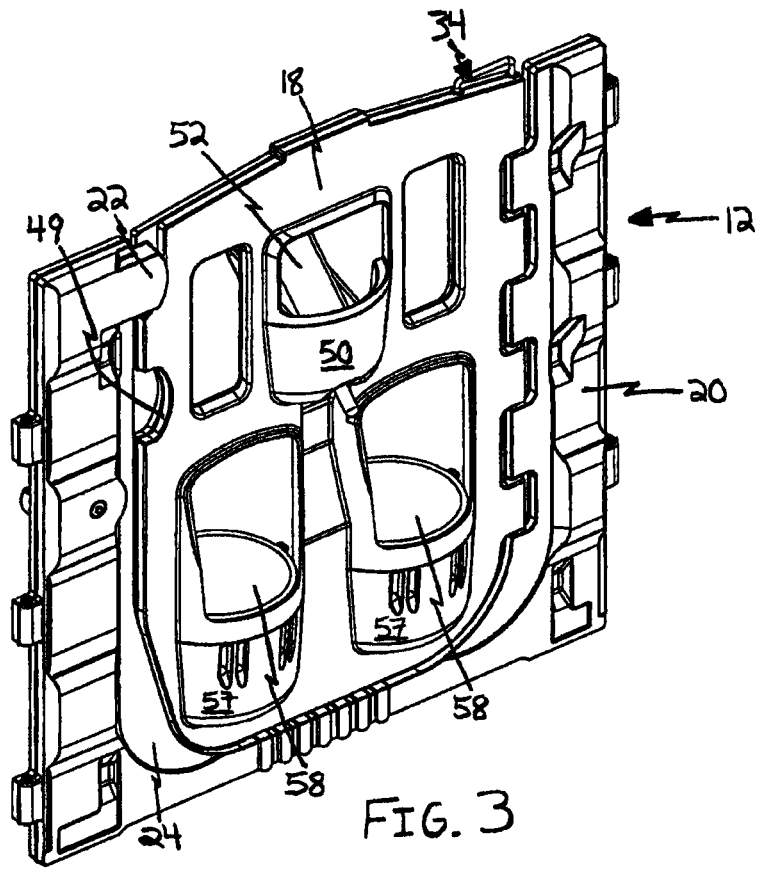
FIG. 3
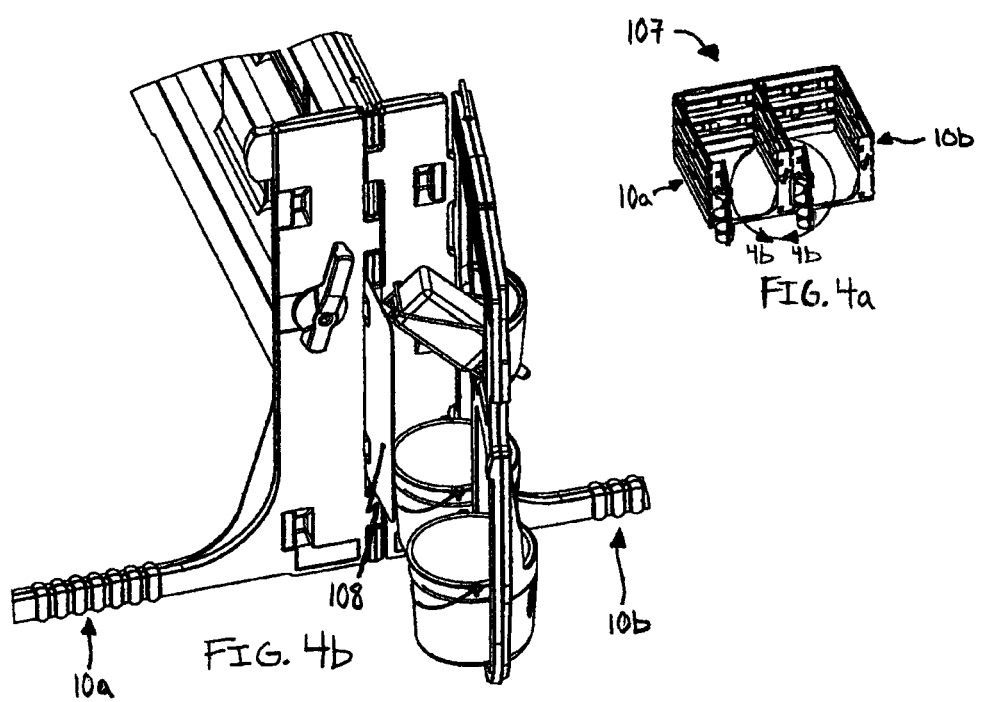
FIG. 4a
FIG. 4b

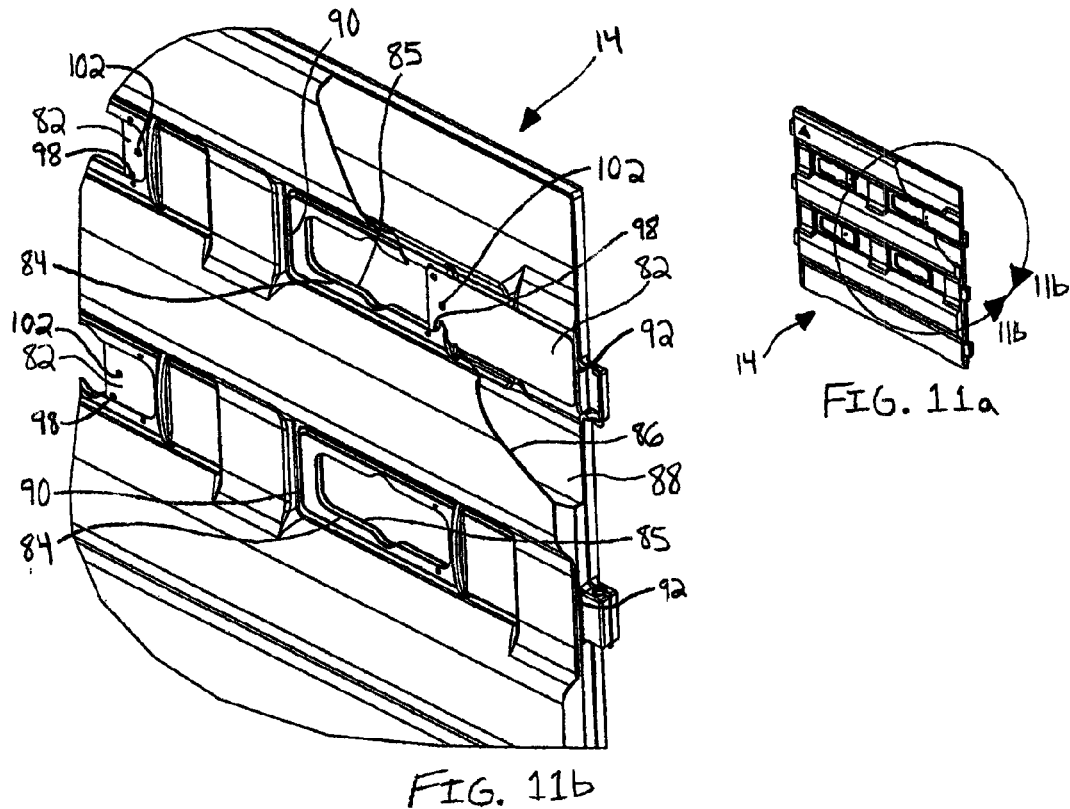
FIG. 11a
FIG. 11b
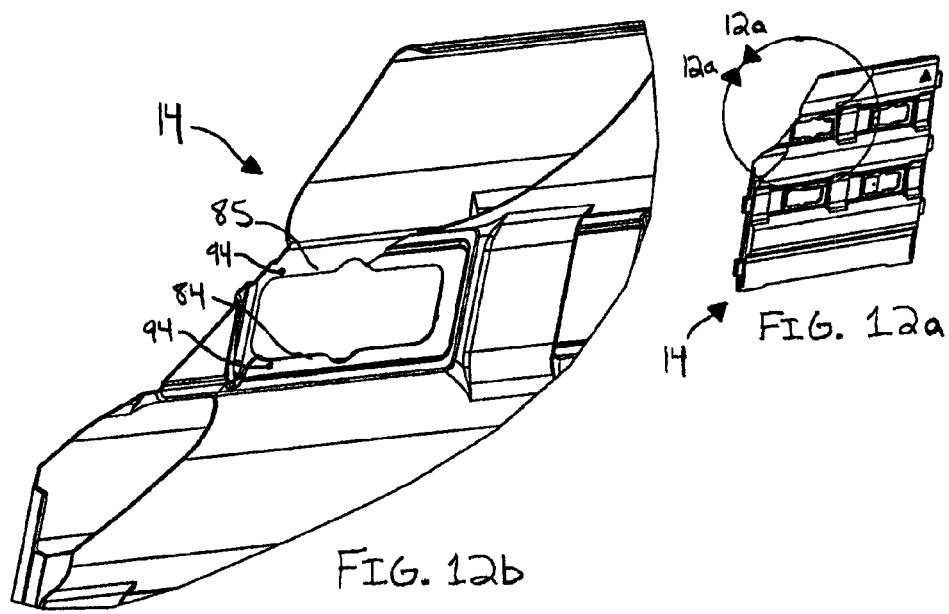
FIG. 12a
FIG. 12b

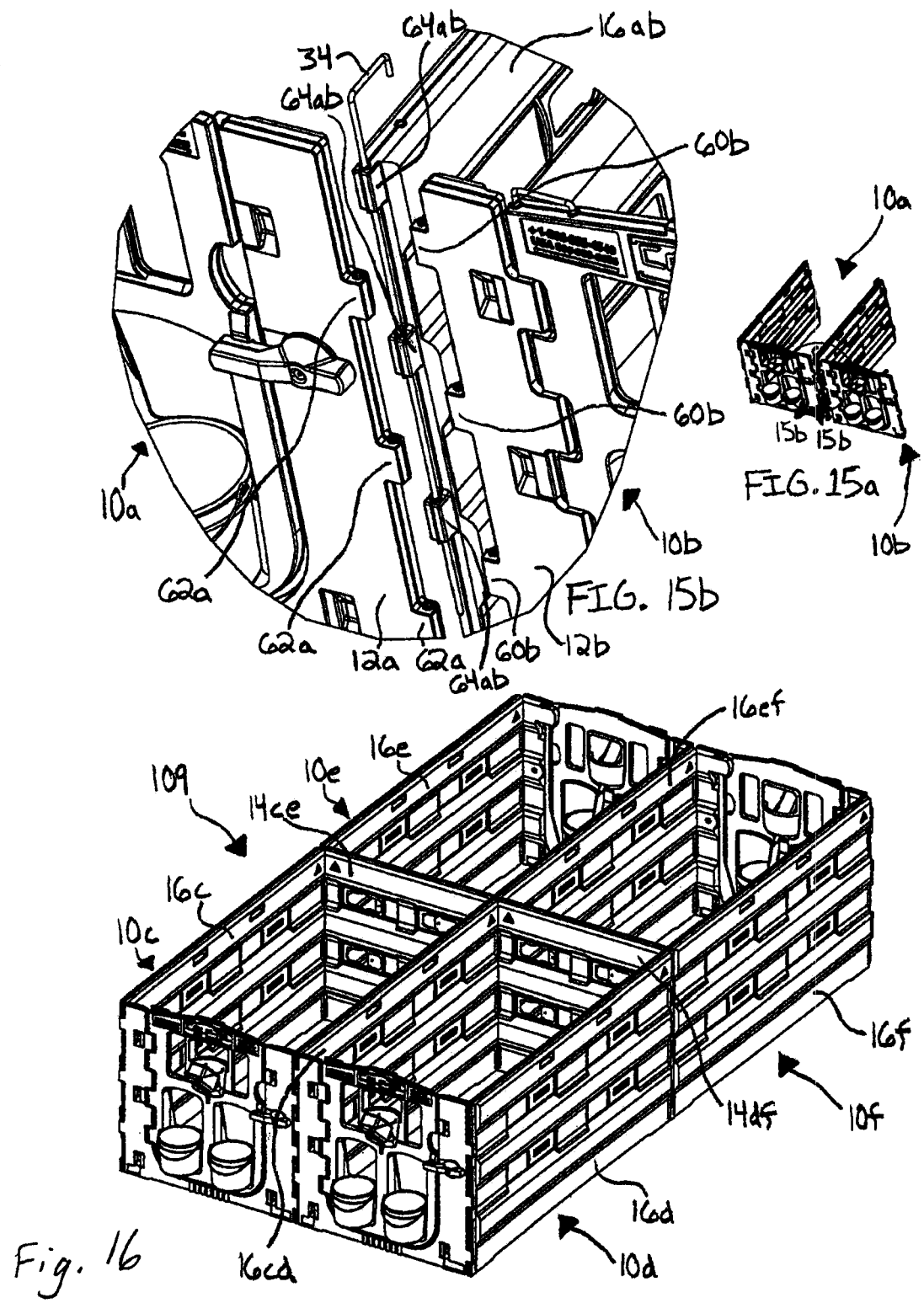

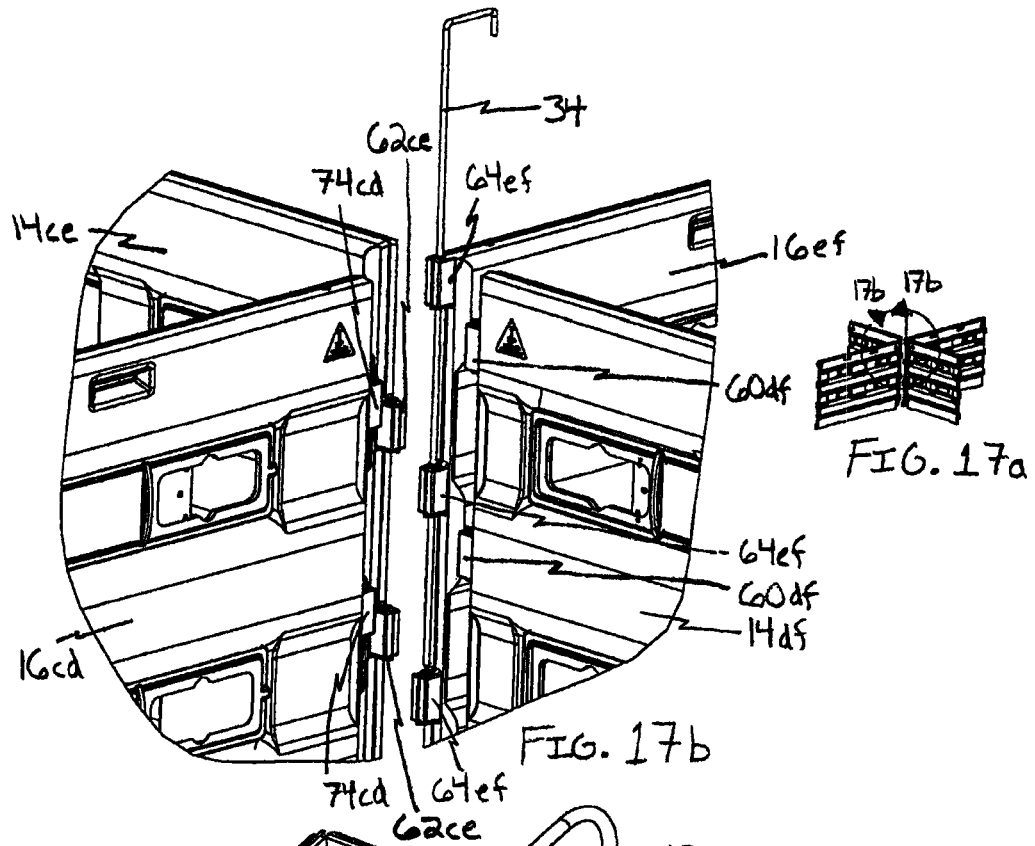
FIG. 17a
FIG. 17b
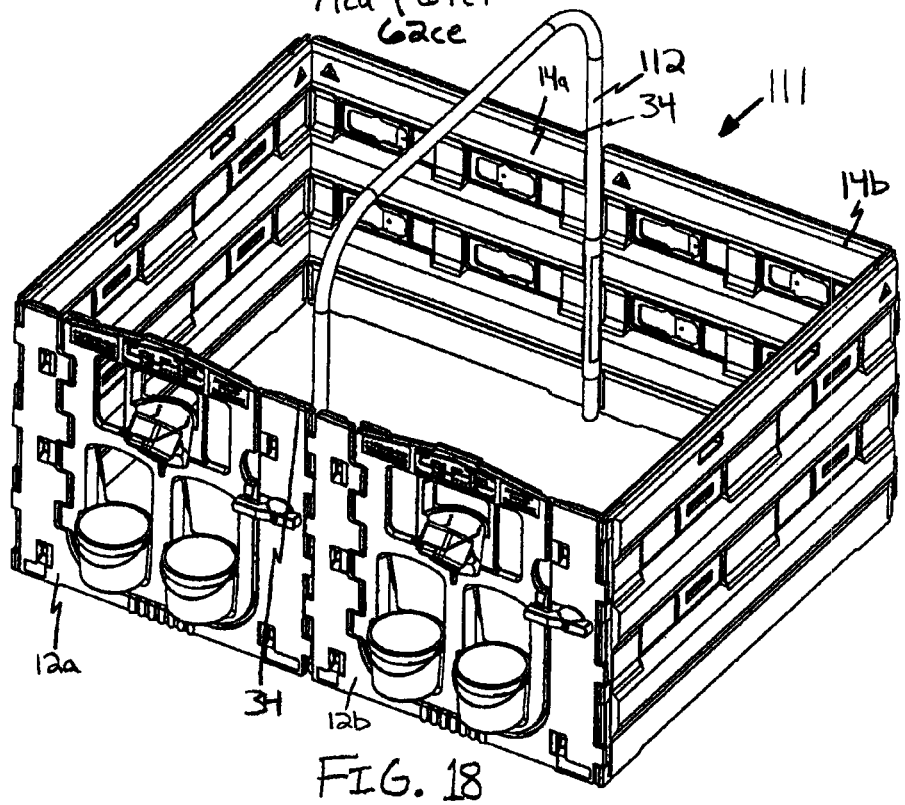
FIG. 18

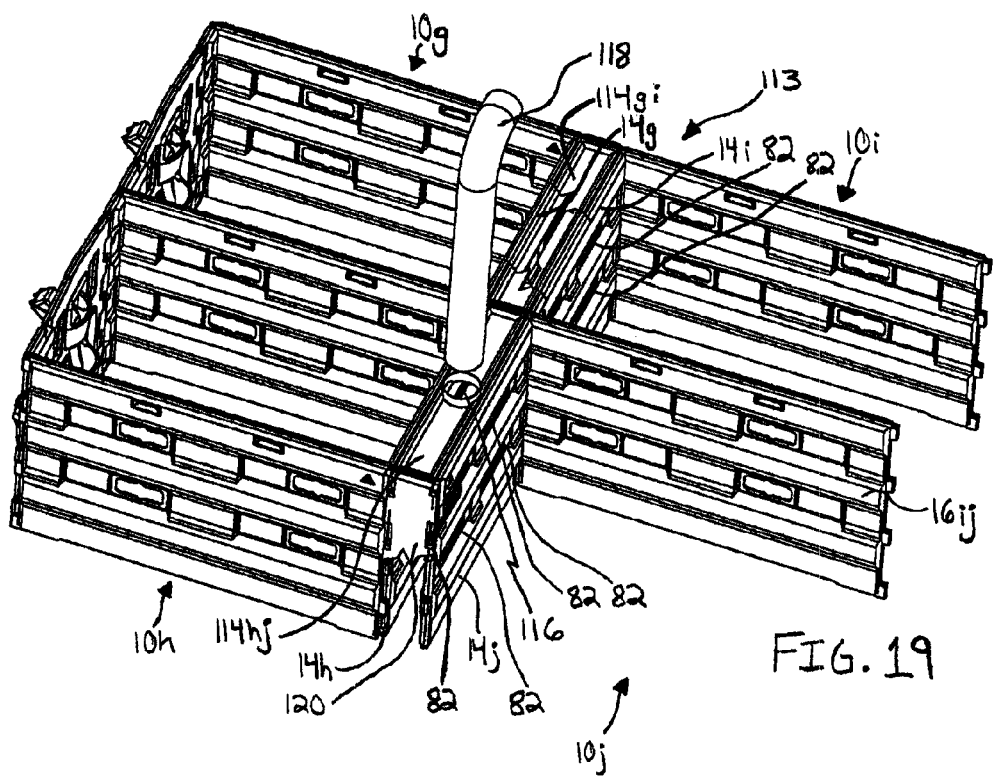
FIG. 19
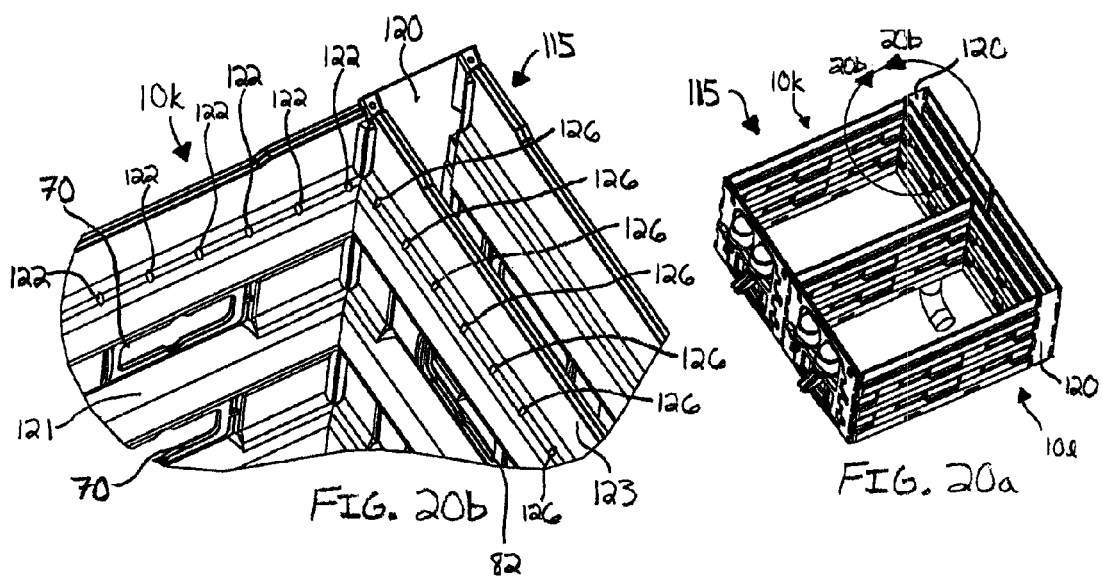
FIG. 20b
FIG. 20a

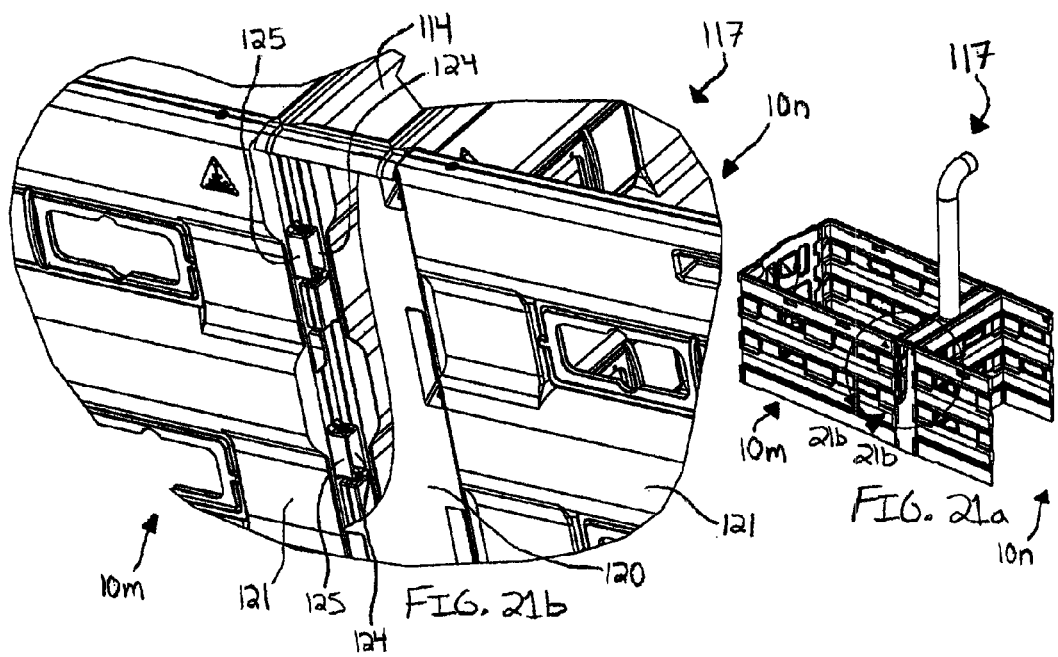
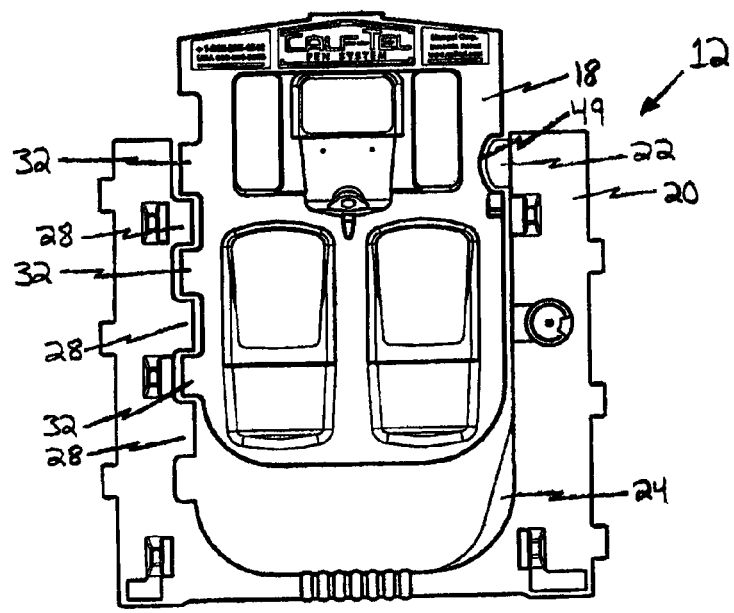

LIVESTOCK CONFINEMENT PEN

CROSS-REFERENCE TO RELATED APPLICATION

This application is a continuation-in-part of U.S. patent application Ser. No. 13/633,499 filed Oct. 2, 2012, which claims the benefit of U.S. Provisional Patent Application No. 61/542,576 filed Oct. 3, 2011, and is a continuation-in-part of U.S. patent application Ser. No. 13/464,575, filed May 4, 2012, which is a divisional of U.S. patent application Ser. No. 12/144,197, filed Jun. 23, 2008, which claims the benefit of U.S. Provisional Patent Application No. 60/936,881, filed on Jun. 22, 2007, the disclosures of all of which are hereby incorporated by reference for all purposes.

STATEMENT CONCERNING FEDERALLY SPONSORED RESEARCH OR DEVELOPMENT

Not applicable.

FIELD OF THE INVENTION

This invention relates to indoor livestock confinement systems, particularly confinement systems that are changeable to different arrangements.

BACKGROUND OF THE INVENTION

Indoor livestock confinement systems are well known in the art for confining animals that are not well suited to living in a free range environment. Many prior art systems succeed in providing the primary function of livestock confinement, but do not succeed in addressing at least one of the following design aspects, including isolating individual animals, providing components that are easily sanitized, providing adequate ventilation, providing adequate accessibility to confined animals, providing components that may be configured to different arrangements, providing portable components, providing durable components, accommodating other functions such as providing feed and water to confined animals, being low cost, and providing components that are effectively shipped and stored. Systems that address more of these aspects provide healthier animals, lower operating costs, and increase operator safety or convenience.

Well known types of livestock confinement systems include pens formed from fencing, wire, or metal gates. However, these types of pens often permit contact between animals confined in adjacent pens. This can be a problem for animals that require isolation from each other at birth, such as dairy calves. Other types of livestock confinement systems include pens with walls formed by wood or masonry. However, pens constructed from wood are not easily sanitized, and pens constructed from masonry are not portable. In addition, such pens also lack in the aspects of ventilation, durability, and configurability. Further types of livestock confinement systems include components made of both steel and plastic. These pens typically include metal frames that are bolted to a larger structure, such as the floor or wall of a building. Plastic panels are supported by the frame and a metal front door is hinged from the frame.

However, these types of pens are not portable since they are fastened to a larger structure. Some designs include large steel hoops over the front door for stability. Such designs are not fastened to a larger structure, providing portability. However, the large steel hoop can be heavy and difficult to carry.

In addition, many of the previously mentioned designs do not succeed in addressing the design aspect of providing adequate ventilation. Providing adequate ventilation is necessary to remove gases emitted from animal waste. This issue is typically addressed by providing constant air movement by using fans or placing the confinement system inside a wall-less building. However, these solutions can create drafts that can be harmful to the confined animals.

SUMMARY OF THE INVENTION

In one aspect, the invention provides an indoor livestock confinement system that includes a plurality of hollow plastic panels. Each panel includes a plurality of spaced tabs at its ends. A first end of each panel includes a first set of tabs, and a second end of each panel includes a second set of tabs. Each set of tabs includes at least one tab at a top portion of the end, at least one tab at an intermediate portion of the end, and at least one tab at a lower portion of the end. The tabs of the first set are offset vertically from the tabs of the second set such that the first set of tabs of a first panel fit vertically between the second tabs of another panel when the ends of the panels are put together. Each tab includes a hole such that a rod can be inserted down through the tabs to lock the panels together.

In another aspect, the plurality of hollow plastic panels may include at least one panel with a sliding vent. The sliding vent is a generally flat panel that is received in guides that are molded into the panel and formed by two spaced apart walls of the panel. A vent opening is formed by cutting out a portion of the panel inside the guides. The vent opening is closed or opened by sliding the sliding vent. The two spaced apart walls of the panel are also pinched outside the sliding vent to prevent the sliding vent from dropping into the panel.

In another aspect, the plurality of hollow plastic panels may include at least one panel that defines a U-shaped door frame. The door frame is open at the top and includes an attachment for a door at one edge. The door frame preferably includes a reinforcement inside the panel that extends across a bottom threshold and sides of the door frame.

In another aspect, the plurality of hollow plastic panels may include at least one panel that provides a door opening and a door that can be closed across the opening. The door includes food bucket holders with openings in the door over the holders. The holders are recessed in the door such that the food buckets extend at least partially into the confinement area. An animal may place its head through one of the openings for access to food.

In another aspect, the plurality of hollow plastic panels may provide interconnected walls to create a group of confinement areas in a back-to-back arrangement. Each confinement area may include its own rear panel. The rear panels of back-to-back confinement areas are spaced apart to create an air plenum between them. The top and the ends of the air plenum are closed, and a duct is in communication with the air plenum. The plurality of hollow plastic panels includes at least one panel with openings to permit air in the confinement area to be drawn into the air plenum.

The foregoing and other objects and advantages of the invention will appear in the detailed description that follows. In the description, reference is made to the accompanying drawings that illustrate a preferred embodiment of the invention.

BRIEF DESCRIPTION OF THE DRAWINGS

FIG. 3 is a rear perspective view of the front panel of FIG. 2;

FIG. 4a is a perspective view of a side-to-side arrangement of pens with doors of the pens in open positions;

FIG. 4b is a detail view of the area 4b-4b of FIG. 4a;

FIG. 11a is a perspective sectional view of the rear panel of FIG. 9;

FIG. 11b is a detail view of the area 11b-11b of FIG. 11a;

FIG. 12a is a perspective sectional view of the rear panel of FIG. 9;

FIG. 12b is a detail view of the area 12b-12b of FIG. 12a;

FIG. 15a is an exploded perspective view of the side-to-side arrangement of pens of FIG. 14 with the back and right side walls removed;

FIG. 15b is a detail view of the area 15b-15b of FIG. 15a;

FIG. 16 is a perspective view of a back-to-back arrangement of pens;

FIG. 17a is an exploded perspective view of the back-to-back arrangement of pens of FIG. 16;

FIG. 17b is a detail view of the area 17b-17b of FIG. 17a;

FIG. 18 is a perspective view of a side-to-side arrangement of pens including a side panel replacement bar;

FIG. 19 is a perspective sectional view of a back-to-back arrangement of pens including ventilation components with some of the walls omitted;

FIG. 20a is a perspective view of the back-to-back arrangement of pens of FIG. 19 with side and rear panels that include ventilation holes;

FIG. 20b is a detail view of the area 20b-20b of FIG. 20a;

FIG. 21a is a perspective sectional view of the back-to-back arrangement of pens of FIG. 19 with side panels that include interdigitating tabs with ventilation holes;

FIG. 21b is a detail view of the area 21b-21b of FIG. 21a;

FIG. 22 is a front plan view of the manufacturing position of the front panel of the door and door frame of FIG. 2;

DETAILED DESCRIPTION OF THE PREFERRED EMBODIMENT

Figure 1:
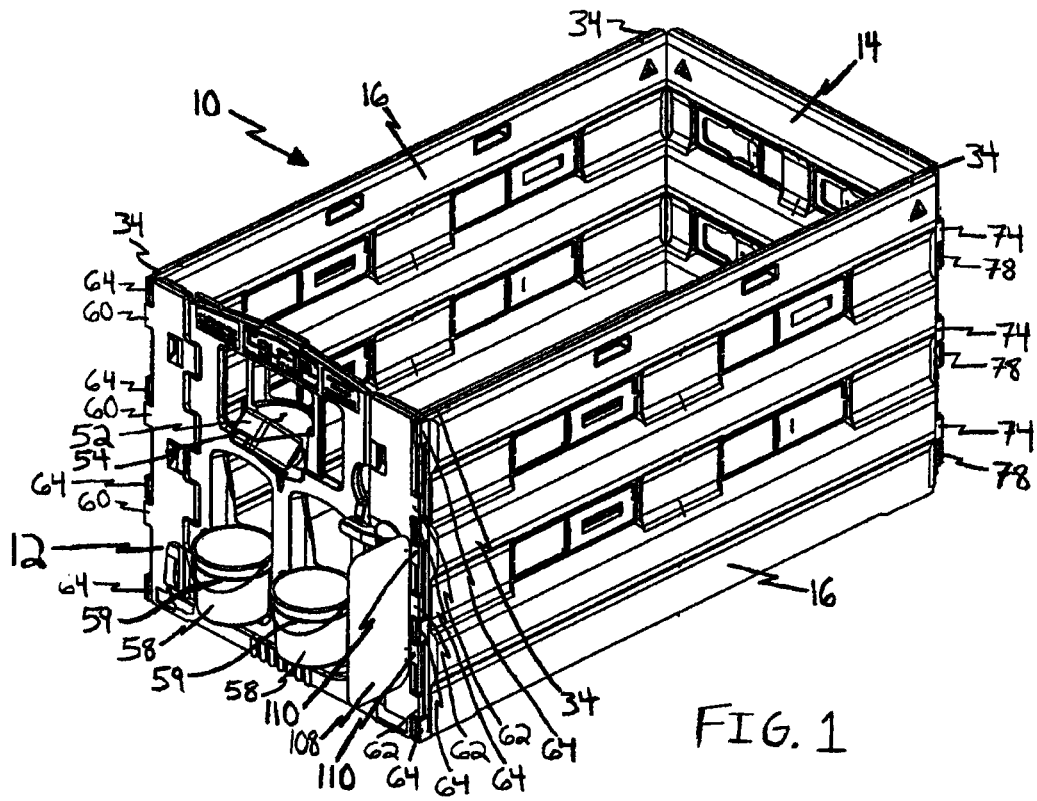
FIG. 1 is a perspective view of a pen of a livestock confinement system according to the present invention.

Referring to FIG. 1, a free-standing plastic indoor livestock confinement system according to the present invention includes at least one pen 10. Each pen 10 includes a front panel 12, a rear panel 14, and two side panels 16. The two side panels 16 are identical to each other and positioned in the same orientation. Preferably, all of the panels 12, 14, and 16 are hollow and made from plastic. In general, the pen 10 is about twice as long in the direction of the plane of the side panels 16 compared to the width in the direction of the plane of the front panel 12. This size is preferable since it provides adequate space for a confined animal and reduces the distance between pens for a caregiver. However, the length of the side panels 16 may be modified to suit the needs of the particular type of confined animal. The pen 10 is preferably high enough to prevent contact between confined animals in adjacent pens. In addition, the dimensions of the panels are preferably suitable for shipping by overseas containers and trucks. As such, the length and height of the panels should be designed similar to the horizontal surface of a shipping pallet.

Figure 2:
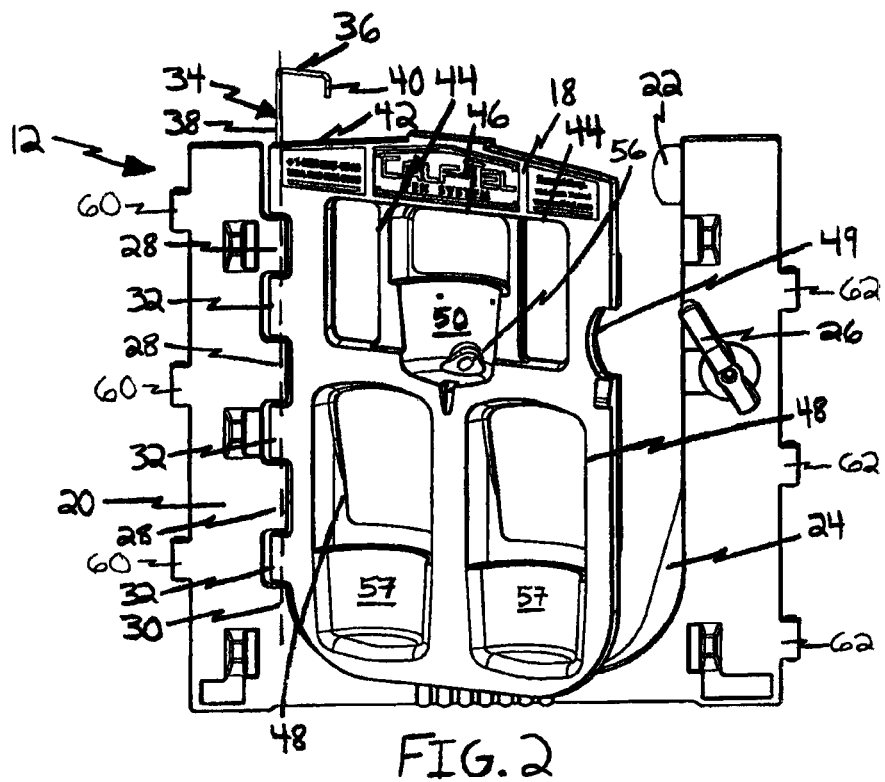
FIG. 2 is a front plan view of a front panel of the pen of FIG. 1 with a door partially open.

Referring to FIG. 2, the front panel 12 of the pen 10 includes a door 18 and a door frame 20. The door frame 20 is generally U-shaped and forms a door opening for the door 18. The door 18 can be closed across the door opening formed by the door frame 20. The door frame 20 includes an upper stop 22 and a lower stop 24. The stops 22 and 24 prevent the door 18 from entering the confinement area. The door frame 20 also includes a latch 26 that is rotatable to secure the door 18 when the door 18 is closed. The door frame 20 further includes a plurality of knuckles 28 that form a hinge axis 30 in part. The knuckles 28 interdigitate with knuckles 32 on the door 18 that also form the hinge axis 30 in part. The knuckles 28 and 32 include holes aligned in the direction of the hinge axis 30.

The knuckles 28 and 32 are preferably formed as part of the door frame 20 and the door 18, respectively. Alternatively, the knuckles 28 and 32 may be made from separate metallic elements. However, integral knuckles 28 and 32 are preferred since they cost less, do not corrode, require less assembly, and are maintenance free.

A rod 34 is passed through holes on the knuckles 28 and 32 that permits the door 18 to rotate about the hinge axis 30 relative to the door frame 20. The rod 34 preferably includes a handle portion 36 that extends at a right angle relative to a locking portion 38. The handle portion 36 of the rod 34 facilitates removal of the rod 34 if the pen 10 is to be modified. The rod 34 also preferably includes a peg portion 40 that extends downwardly from the end of the handle portion 36 opposite the locking portion 38. The peg portion 40 is received in a hole 42 on the door 18 to prevent the rod 34 from rotating away from the door 18. The rod 34 may be made from a metallic or plastic material.

Still referring to FIG. 2, the door 18 includes side openings 44, central opening 46, lower openings 48, and a hand grip 49. The openings 44, 46, and 48 provide ventilation to the confinement area. A recessed holder 50 that projects in the direction the door 18 closes is provided below the central opening 46. The holder 50 accommodates a water bottle 52, as shown in FIG. 1. The water bottle 52 is fixed to the holder 50 by a frame 54. As shown in FIG. 2, the holder 50 includes a hole 56. The hole 56 permits the top of the water bottle 52 to enter the confinement area of the pen 10, as shown in FIG. 3, thereby providing water to the confined animal. A recessed holder 57 that projects in the direction the door 18 closes is provided below each lower opening 48. Each holder 57 preferably accommodates a bucket 58, as shown in FIG. 1. Each bucket 58 is fixed to the holder 57 by a ring-shaped frame 59 that attaches to the door 18. Each bucket 58 may contain feed for the confined animal, and the confined animal may obtain feed by moving its head through a single lower opening 48.

The holders 57 are designed such that the center of each bucket 58 is located at a plane in the center of the door 18 that is parallel to and intersects the hinge axis 30. Each bucket 58 thereby extends at least partially into the confinement area. As shown in FIG. 4b, this permits the door 18 to open wider than a door with a bucket located outside the pen 10. In addition, the confined animal is able to feed more easily compared to other designs since each bucket 58 is partially inside the confinement area. This permits the size of each lower opening 48 to be smaller than other doors. A smaller opening prevents the confined animal from exiting the pen 10 through the opening. In addition, the door 18 will undergo less deformation since the weight of the bucket is not cantilevered on the door 18.

Referring again to FIG. 2, the left and right sides of the front panel 12 include upper tabs 60 and lower tabs 62, respectively. There are preferably three upper tabs 60 on the front panel 12. Specifically, there should be one upper tab at an upper portion of the front panel 12, one upper tab at an intermediate portion, and one upper tab at a lower portion. There are also preferably three lower tabs 62 on the front panel 12. Specifically, there should be one lower tab at an upper portion of the front panel 12, one lower tab at an intermediate portion, and one lower tab at a lower portion. However, the number of upper tabs 60 and lower tabs 62 on the front panel 12 may be modified. In addition, each lower tab 62 is vertically offset from each upper tab 60 to permit assembly of different arrangements of pens. This will be explained in further detail below.

Figure 6:
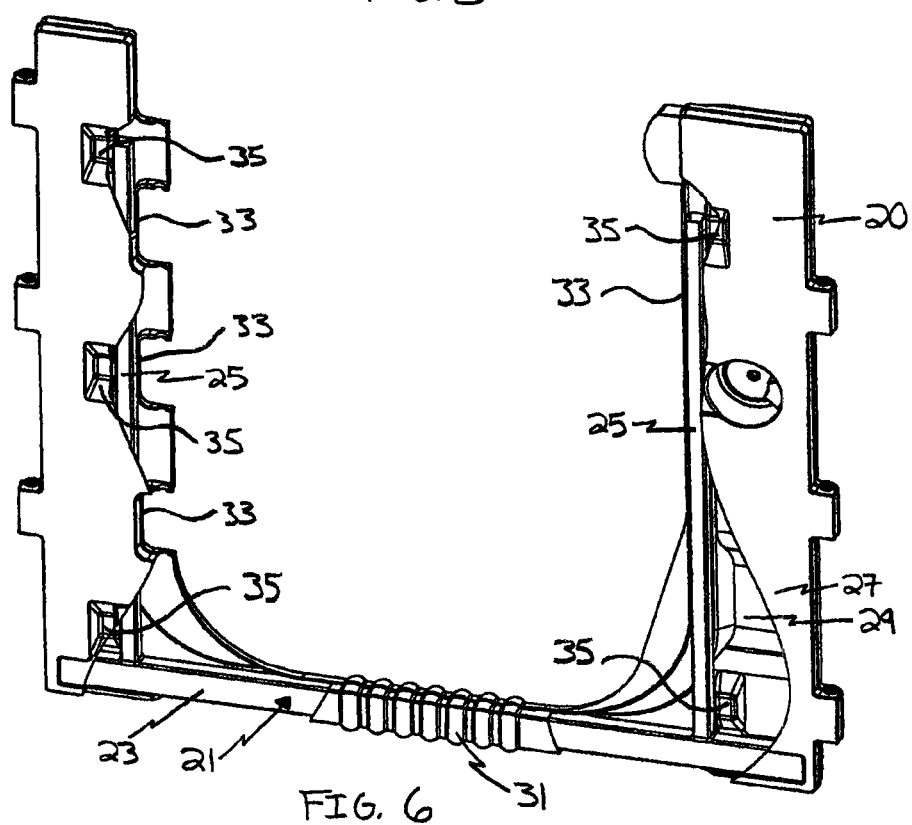
FIG. 6 is a perspective sectional view of a door frame of the front panel of FIG. 2.

Referring to FIG. 6, it should be noted that the door frame 20 does not include a top section. This is necessary so that the caregiver may enter the confinement area without crouching. Since a top section is not present, the door frame 20 includes a reinforcement 21 located between two walls 27 and 29 of the door frame 20. The reinforcement 21 prevents deformation of the door frame 20 which will be explained in further detail below. The reinforcement 21 may be made from welded tube stock components. The reinforcement 21 includes a horizontal section 23 that extends across the bottom threshold of the door frame 20. The reinforcement 21 also includes two upright sections 25 that extend up the sides of the door frame 20. The door frame 20 also includes an accordion-like structure 31 which will be explained in further detail below.

Figure 5:
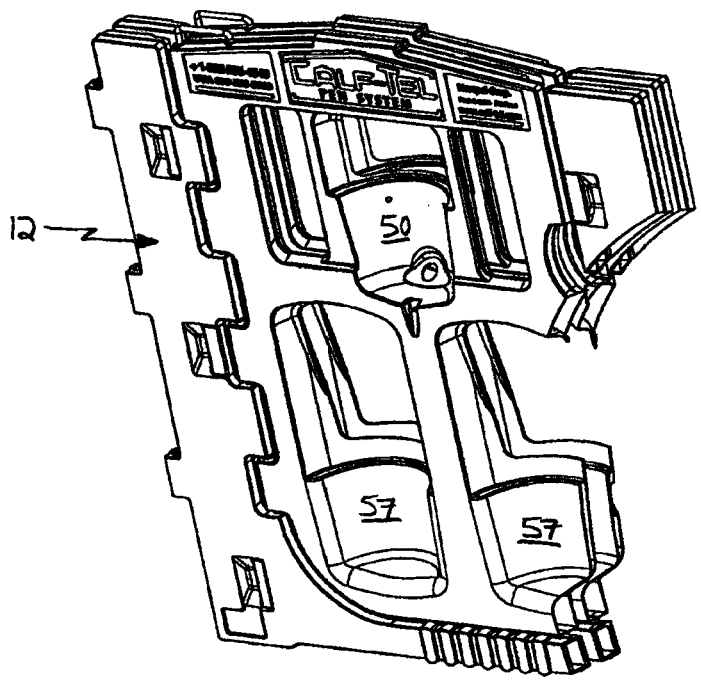
FIG. 5 is a perspective sectional view of nesting front panels of FIG. 2.

Referring to FIG. 5, the front panel 12 is designed such that a set of front panels conform for stacking. That is, the holders 50 and 57 nest within the open space of an adjacent front panel. Such a design reduces lost shipping space and permits the set of front panels to lay flat on a pallet.

As best shown in FIG. 1, the upper tabs 60 and the lower tabs 62 on the front panel 12 are vertically offset from, or interdigitate with, the front tabs 64 on the two side panels 16. Rods 34 identical to the component described above pass through holes in the tabs 60 and 64, and 62 and 64, thereby connecting the front panel 12 and the two side panels 16. There are preferably four front tabs 64 on each side panel 16. Specifically, there should be one front tab at an upper portion of each side panel 16, two front tabs at intermediate portions, and one front tab at a lower portion. However, the number of front tabs 64 on each side panel 16 may be modified.

Figure 7:
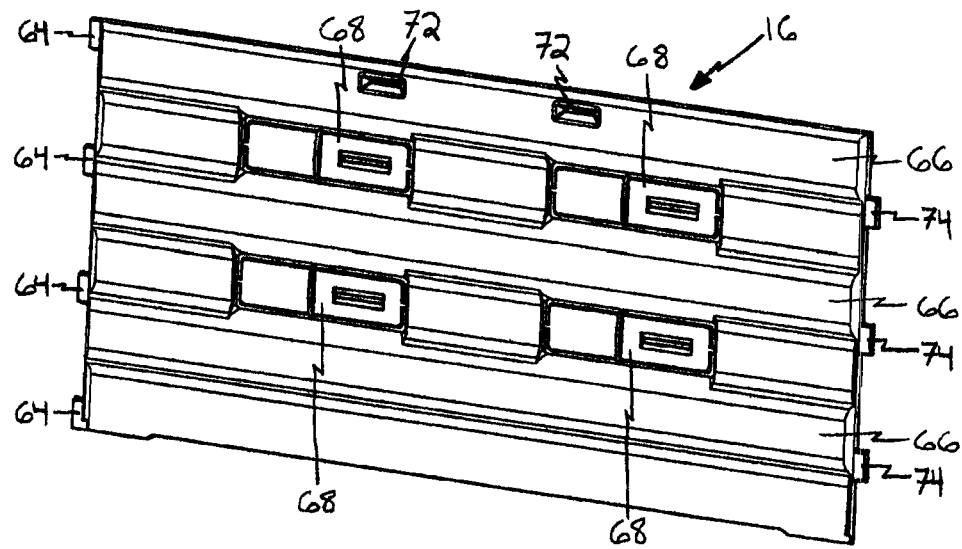
FIG. 7 is a perspective view of a side panel of the pen of FIG. 1 including wall panels.
Figure 8:
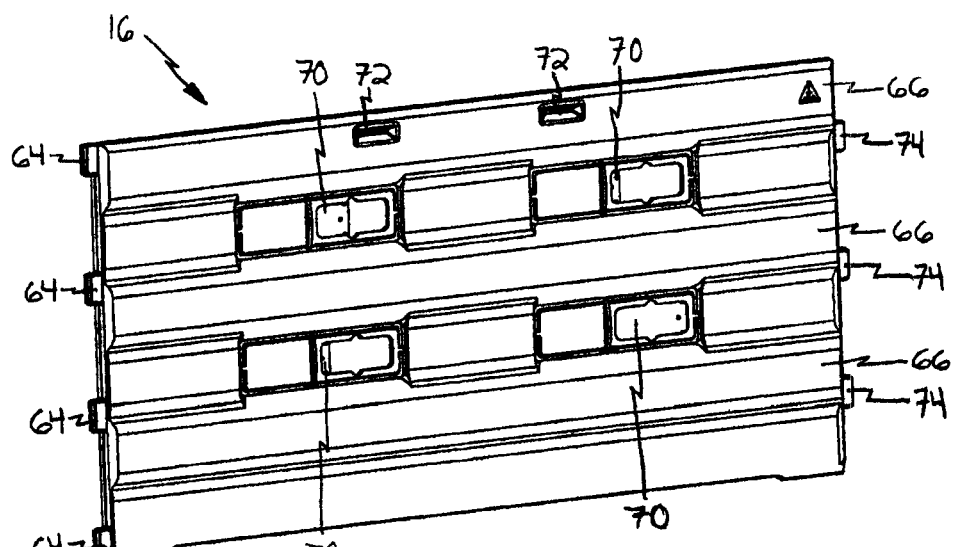
FIG. 8 is a perspective view of a side panel of the pen of FIG. 1 including sliding vents.

Referring to FIGS. 7 and 8, each side panel 16 is preferably hollow, light-weight, and includes horizontal ribs 66 that provide more rigidity than the original flexible material used to create the side panels 16. Manufacturing of the panels will be explained in further detail below. Horizontal ribs 66 are also advantageous for shipping a set of side panels as will be explained in further detail below. Each side panel 16 may include either a plurality of wall panels 68, as shown in FIG. 7, or a plurality of sliding vents 70, as shown in FIG. 8. Sliding vents 70 are slidable to create a vent opening to the confinement area, as will be described in further detail below. Each side panel 16 may include a plurality of grips 72 recessed in the side panel 16. Each side panel 16 also includes rear tabs 74. There are preferably three rear tabs 74 on each side panel 16. Specifically, there should be one rear tab at an upper portion of each side panel 16, one rear tab at an intermediate portion, and one rear tab at a lower portion. However, the number of rear tabs 74 on each side panel 16 may be modified. In addition, the rear tabs 74 are vertically offset from the front tabs 64 to permit assembly of different arrangements of pens.

Figure 9:
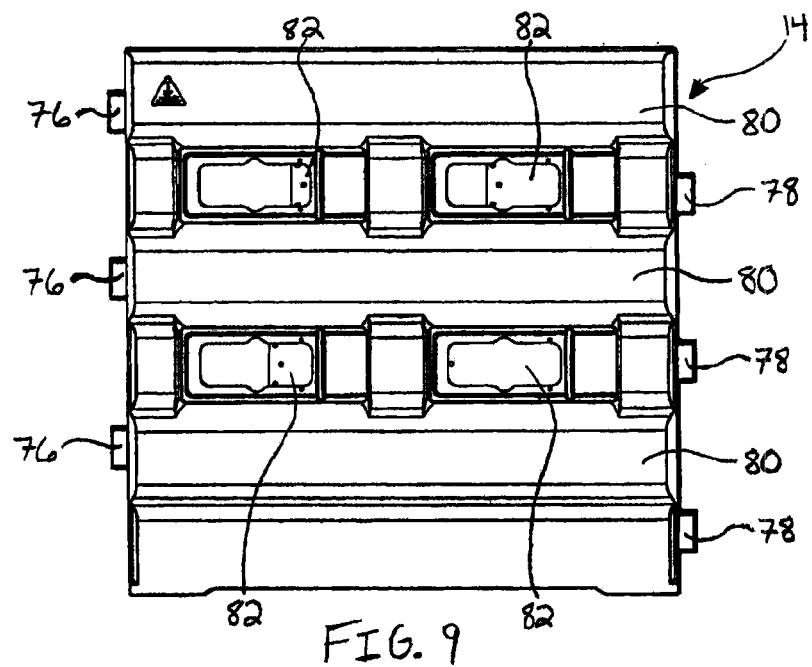
FIG. 9 is a plan view of a rear panel of the pen of FIG. 1.

As best shown in FIG. 1, the rear tabs 74 on each side panel 16 interdigitate with tabs on the rear panel 14. The tabs on the rear panel 14 are best shown in FIG. 9 and include upper tabs 76 and lower tabs 78 on the left and right sides of the rear panel 14, respectively. There are preferably three upper tabs on the rear panel 14. Specifically, there should be one upper tab at an upper portion of the rear panel 14, one upper tab at an intermediate portion, and one upper tab at a lower portion. There are also preferably three lower tabs 78 on the rear panel 14. Specifically, there should be one lower tab at an upper portion of the rear panel 14, one lower tab at an intermediate portion, and one lower tab at a lower portion. However, the number of tabs 76 and 78 on the rear panel 14 may be modified. In addition, the lower tabs 78 are vertically offset from the upper tabs 76 to permit assembly of different arrangements of pens.

Referring again to FIG. 1, rods 34 identical to the component described above pass through holes in the tabs 74 and 76, and 74 and 78, thereby connecting the two side panels 16 and the rear panel 14.

Figure 10:
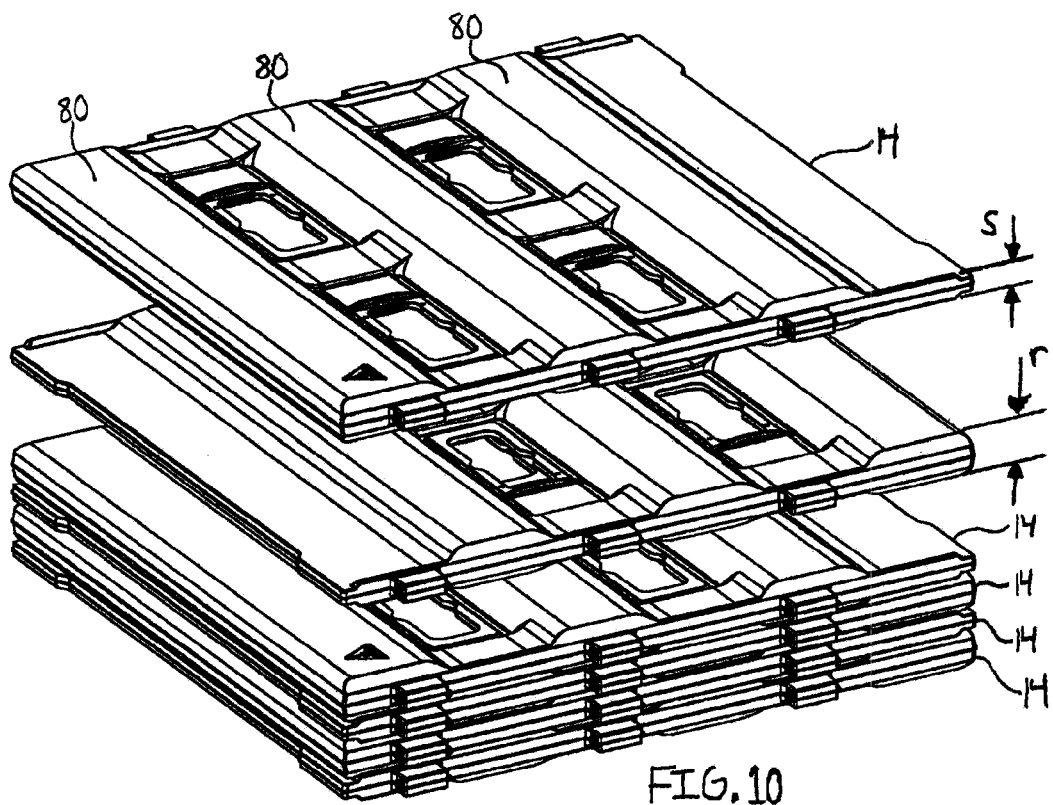
FIG. 10 is a perspective view of a stack of rear panels of FIG. 9.

Referring to FIG. 9, the rear panel 14 is preferably hollow, light-weight, and includes horizontal ribs 80 that provide rigidity. Horizontal ribs 80 are also advantageous for shipping and storage, as shown in FIG. 10. It should be understood that two rear panels 14 in FIG. 10 are elevated to illustrate dimensions r and s of the panels, which are described in further detail below. The overall height of the stack is reduced and stability of the stack is provided by stacking the panels horizontally and rotating every other panel 180 degrees. Therefore, the overall height of the stack of rear panels is less than the dimension over the ribs 80 of the rear panel times the number of rear panels in the stack. Generally, the overall height of a stack of rear panels is $r+((p-1)(s+r)/2)$, where r is the dimension over the ribs 80 as shown in FIG. 10, s is the dimension over the area adjacent to the ribs 80 as shown in FIG. 10, and p is the number of panels in the stack. To achieve this reduction in stacking height, it is necessary to design the panels such that the space between ribs 80 on a single panel is approximately the negative shape of the ribs 80. The ribs of a rear panel thereby nest between the ribs of adjacent panels. A set of side panels 16 is also preferably designed, shipped, and stored in a similar manner.

The rear panel 14 may also include a plurality of sliding vents 82 similar to those of the two side panels 16. FIG. 11b is a partial sectional view of the rear panel 14 for illustration purposes. Referring to FIG. 11b, each sliding vent 82 is generally flat and is received guideways formed between two vent guides 84 and 85 that are molded into the rear panel 14. The portion of the rear panel 14 inside of the vent guides 84 and 85 is cut out from two spaced apart walls 86 and 88 of the rear panel 14 to create a vent opening that is closed or opened by sliding the sliding vent 82. Each sliding vent 82 is slidable to enter the hollow body of the rear panel 14. The two spaced apart walls 86 and 88 of the rear panel 14 are pinched together at a left area 90 and a right area 92 to set the range of motion of the sliding vent 82. The left area 90 and the right area 92 are preferably spaced apart more than the length of the sliding vent 82 to permit the sliding vent 82 to be slid open. However, the right area 92 is also preferably positioned on the rear panel 14 to prevent the sliding vent 82 from dropping into the rear panel 14. The two spaced apart walls 86 and 88 are also preferably pinched near the top and bottom edges of the sliding vent 82. One of the vent guides 84 and 85 includes a large bump (not shown) that engages an interfitting hole 98 in the sliding vent 82, thereby holding the sliding vent 82 in the closed position. Each sliding vent 82 includes a structure 102 that may be engaged by a hand tool, such as a screw driver, to assist in positioning the sliding vent 82. The structure 102 may be a through hole, a dimple, or a notch.

Figure 13:
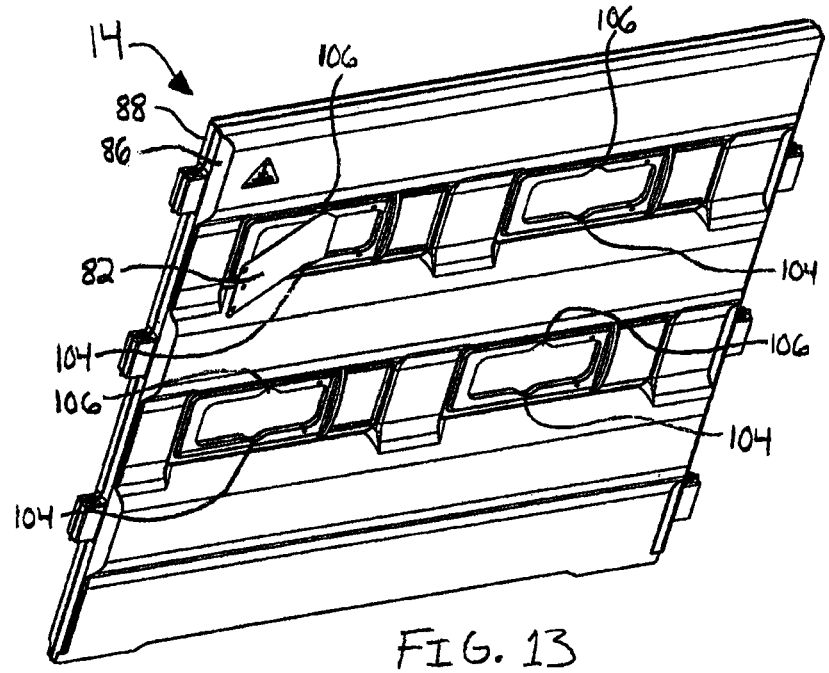
FIG. 13 is a perspective view of the rear panel of FIG. 9 illustrating removal of a sliding vent.

FIG. 12b is a partial sectional view of the rear panel 14 with the sliding vent removed for illustration purposes. Referring to FIG. 12b, each vent guide 84 and 85 includes a plurality of bumps 94 that create friction with the sliding vent. This permits the sliding vent to remain in an intermediate open position. As shown in FIG. 13, the two spaced apart walls 86 and 88 of the rear panel 14 may also include cut sections 104 and 106 adjacent to the vent opening for removing the sliding vent 82. In addition, sliding vents 82 may be made from a transparent material if visual contact is required. The sliding vents 70 and vent guides (not shown) of the two side panels 16 may also include similar features to those described above.

Figure 14:
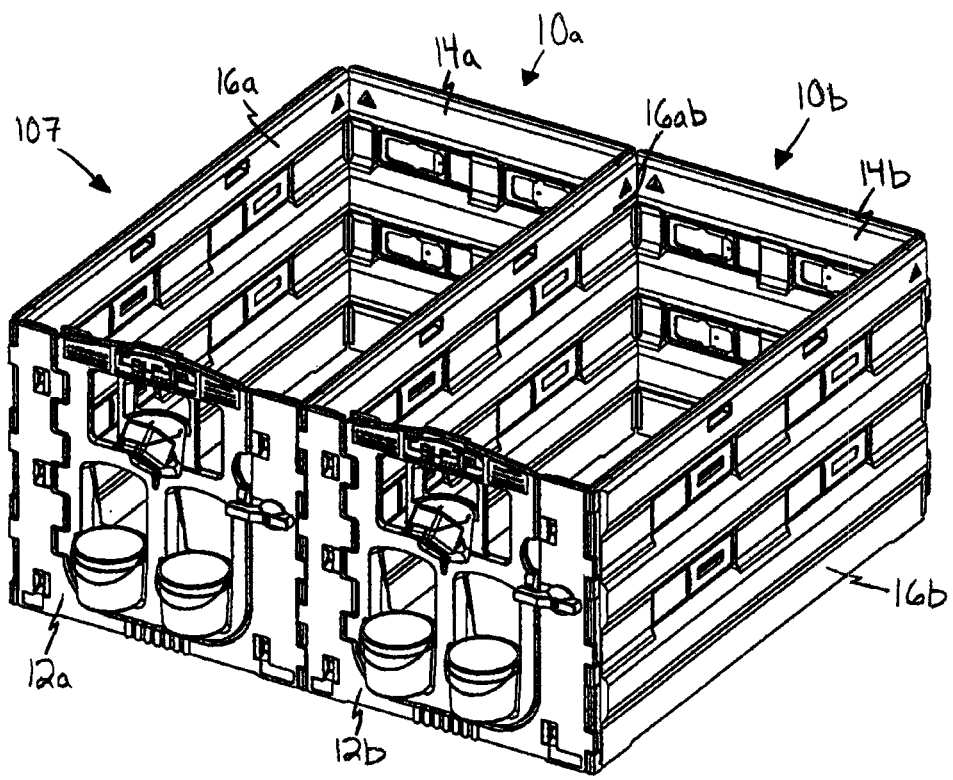
FIG. 14 is a perspective view of a side-to-side arrangement of pens.

The components of the present invention provide a livestock confinement system that is configurable between different arrangements. The arrangements shown in FIGS. 14, 16, and 19 are examples of such different arrangements. In addition, arrangements may be assembled wherein common panels are shared by multiple pens. Referring to FIG. 14, multiple pens 10a and 10b may be arranged in a side-to-side arrangement 107 wherein the pens 10a and 10b include individual side panels 16a and 16b and share a common side panel 16ab. It should be understood that the panels 12, 14, and 16 in the side-to-side arrangement 107 are identical to those described previously. It should also be understood that FIGS. 15a and 15b show the same side-to-side arrangement 107 as FIG. 14. However, FIGS. 15a and 15b are exploded perspective views with several panels removed for simplicity. As most easily understood from FIG. 15b, lower tabs 62a from a left front panel 12a and upper tabs 60b from a right front panel 12b interdigitate with front tabs 64ab on the common side panel 16ab. All three panels are held in place by a single rod 34. Referring to FIG. 14, the common side panel 16ab connects to a left rear panel 14a and a right rear panel 14b in a similar manner. The side-to-side arrangement 107 is not limited to two adjacent pens; any number of pens may be placed in the arrangement, and only a front panel 12, a rear panel 14, and a single side panel 16 are needed for each additional pen.

Referring to FIG. 16, multiple pens may be arranged in a back-to-back arrangement 109 wherein pens 10c, 10d, 10e, and 10f share rear panels and side panels. Specifically, pens 10c and 10d share a common side panel 16cd. Pens 10e and 10f share a common side panel 16ef. Pens 10c and 10e share a common rear panel 14ce. Pens 10d and 10f share a common rear panel 14df. It should be understood that FIGS. 17a and 17b show the same back-to-back arrangement 109 as FIG. 16. However, FIGS. 17a and 17b are exploded perspective views of the intersection of the rear panels 14ce and 14df, and side panels 16cd and 16ef. As most easily understood from FIG. 17b, rear tabs 74cd of the common side panel 16cd and front tabs 64ef of the common side panel 16ef interdigitate with lower tabs 62ce on the common rear panel 14ce and upper tabs 60df on the common rear panel 14df. All four panels are held in place by a single rod 34. Referring to FIG. 16, side panels 16c and 16e are connected to the common rear panel 14ce in a similar manner, and side panels 16d and 16f are connected to the common rear panel 14df in a similar manner. It should be noted that side panels 16e, 16f, and 16ef on the pens 10e and 10f are rotated 180° relative the front panels of the pens discussed previously. This is done so that the tabs on adjacent side panels, such as 16c and 16e, do not interfere with each other. This is most easily understood from the exploded view of FIG. 17b. The back-to-back arrangement 109 is not limited to four pens; any number of pens may be placed in the arrangement. Only two front panels 12, a rear panel 14, and two side panels 16 are needed for each pair of pens in addition to those shown in FIG. 16. Alternatively, the back-to-back arrangement 109 may only include a single pair of pens configured in a back-to-back manner if desired.

Referring to FIGS. 17a and 17b, there are a total of thirteen tabs at the intersection of the panels 14ce, 14df, 16cd, and 16ef. At least three tabs are required on each panel to maintain structural integrity of the arrangement of pens. As such, each panel includes at least one tab at a top portion of each end, at least one tab at an intermediate portion of each end, and at least one tab at a lower portion of each end. Therefore, there should be at least a total of twelve tabs at the intersection. However, in order to provide tabs near the top and bottom of the intersection, and therefore provide more structural integrity, there should be at least a total of thirteen tabs at the intersection. That is, a single panel should have four tabs. Referring to FIG. 17b, the side panel 16ef includes four front tabs 64ef. Alternatively, a different panel may include four tabs and the side panel 16ef may include three front tabs 64ef provided that all the tabs at the intersection are vertically offset from each other. As another alternative, the number of tabs on the panels may be modified. For example, three panels may have n tabs, and one panel may have n+1 tabs, resulting in 4n+1 total tabs at the intersection (where n is a number greater than zero). However, a total of thirteen tabs at the intersection is preferred since this number provides adequate structural integrity and low potential for misalignment of the tabs when inserting the rod 34.

Referring to FIGS. 1 and 4b, an appropriate number of extension panels 108 are preferably provided with such adjacent arrangements to prevent contact between adjacent confined animals. Each extension panel 108 includes tabs 110 with holes (not shown). Each extension panel 108 is connected to the pen 10 by the rod 34 that also connects adjacent panels. Each extension panel 108 is preferably flexible such that it will easily bend if required.

Referring to FIG. 18, a modified side-to-side arrangement 111 of pens may include a side panel replacement bar 112. The replacement bar 112 may be desirable when the confined animals do not require separation but a rigid housing is still needed. The replacement bar 112 is generally slender and U-shaped. Preferably, the replacement bar 112 is sufficiently sized such that confined animals and the caregiver may easily pass underneath the replacement bar 112 in the orientation shown in FIG. 18. The replacement bar 112 also includes tabs (not shown) with holes. The replacement bar 112 is connected to the arrangement 111 by the rods 34 that connect adjacent front and rear panels. The modified sideto-side arrangement 111 may be created by starting with the side-to-side arrangement 107 (in FIG. 14), removing the rods 34 connecting the common side panel 16*ab* and the front and rear panels 12*a*, 12*b*, 14*a*, and 14*b*, removing the common side panel 16*ab*, placing the replacement bar 112 in the position shown in FIG. 18, and replacing the rods 34 in their original positions.

Referring to FIG. 19, a modified back-to-back arrangement 113 of pens may include components that facilitate ventilation for removing gases emitted by animal waste. It should be understood that the back-to-back arrangement 113 of FIG. 19 includes four pens 10*g*, 10*h*, 10*i*, and 10*j*. However, several panels of the pens 10*i* and 10*j* are not shown in order to provide an unobstructed view of other components. In this arrangement, each pen 10*g*, 10*h*, 10*i*, and 10*j* includes its own rear panel 14*g*, 14*h*, 14*i*, and 14*j*, respectively. The rear panels 14*g* and 14*i*, and 14*h* and 14*j* of the modified back-to-back arrangement 113 are spaced a short distance from one another to form an air plenum between pens. The tops of rear panels 14*g* and 14*i*, and 14*h* and 14*j* are connected by respective duct attachment panels 114*gi* and 114*hj*. It should be understood that the duct attachment panel 114*gi* is partially sectioned to show the air plenum between the pens 10*g* and 10*i*. The edges of each duct attachment panel include channels which fit over and are thereby connected to adjacent panels. Alternatively, each duct attachment panel may be connected to adjacent panels by standard fasteners. Each duct attachment panel 114*gi* and 114*hj* includes an opening 116 that connects to a duct 118. Alternatively, each opening 116 may be connected to a single duct. The opposite end (not shown) of the duct 118 connects to the intake port of an air blower (not shown) that forces air outside the building. The sliding vents 82 on each rear panel 14*g*, 14*h*, 14*i*, and 14*j* may be configured to provide an appropriate amount of airflow to each confinement area. This arrangement of pens also includes side attachment panels 120 that connect back-to-back rear panels 14. The side attachment panels 120 are fixed by the rods 34 connecting adjacent panels. It should be understood that the side attachment panel 120 is partially sectioned to show the air plenum between the pens 10*h* and 10*j*. Like the back-to-back pen arrangement, this arrangement is not limited to two sets of adjacent pens; any number of sets of pens may be placed in the arrangement.

Referring to FIGS. 20*a* and 20*b*, a modified back-to-back arrangement 115 of pens may include alternative components that facilitate ventilation. It should be understood that the back-to-back arrangement 115 of FIGS. 20*a* and 20*b* includes two pens 10*k* and 10*l*. However, additional pens may be added to create an arrangement similar to the arrangement 113. In this arrangement, the air blower, duct attachment panels 114, ducts 118, side attachment panels 120 are included as described above. However, the pens 10*k* and 10*l* include modified side panels 121 and rear panels 123. The side panels 121 and the rear panels 123 include sliding vents 70 and 82, respectively, which are not used. Instead, each side panel 121 and rear panel 123 includes a plurality of holes 122 and 126, respectively. The holes 122 and 126 are located on the lower curved surface of the lower horizontal rib 66 and 80 of each side panel 121 and rear panel 123 so as to open downwardly. The holes 122 and 126 may be located on other parts of the side panels 121 and rear panels 123. However, this location is preferable since it reduces the possibility of animal waste entering the holes 122 and 126. The holes 122 are located on a single side of side panels 121. The holes 126 are located on both sides of rear panels 123.

Referring to FIGS. 21*a* and 21*b*, a modified back-to-back arrangement 117 of pens may include further alternative components that facilitate ventilation. It should be understood that the back-to-back arrangement 117 of FIGS. 21*a* and 21*b* includes two pens 10*m* and 10*n*. However, the pen 10*n* and the side attachment panel 120 are sectioned in order to provide an unobstructed view of other components. Like the previous arrangements, additional pens may be added to the arrangement 117. The modified back-to-back arrangement 117 of pens includes side panels 121 that include rear tabs 125 with openings 124. The openings 124 in the rear tabs 125 permit air to be drawn from the confinement area through the hollow side panels 121 and into the air plenum below the duct attachment panel 114. From the air plenum below the duct attachment panel 114 air can be removed from the building. Alternatively, the side panels 121 and the rear panel 123 may include aligned holes where the panels intersect to permit air to be drawn through the side panels 121 and into the rear panel 123.

Each arrangement of pens that facilitate ventilation may include intermediate attachment panels (not shown) similar to the side attachment panel 120. Referring to FIG. 19, the intermediate attachment panels may be located inside the air plenum forming an intersection of four panels together with the rear panels 14*j* and 14*i* and the side panel 16*ij*. Like the side attachment panel 120, the intermediate attachment panels may be fixed by the rods 34 connecting adjacent panels. The intermediate attachment panels may further include holes that permit air flow between sections of the air plenum.

The front panel 12, the rear panels 14 and 123, and the side panels 16 and 121 may be manufactured using several different processes. These processes include, but are not limited to, twin-sheet thermoforming, blow molding, and rotational molding. These manufacturing processes are well known in the art. Twin-sheet thermoforming is preferably used to create the door frame 20 due to the reinforcement 21. Inserting the reinforcement 21 during blow molding or rotational molding is not practical.

The twin-sheet thermoforming process for forming the panels according the present invention is as follows. First, two sheets of thermoplastic are heated simultaneously while being held by a plurality of clamps. Next, the two sheets are inserted into a molding machine that includes two molds, an upper mold and a lower mold, mounted to face each other. The two molds are typically horizontal and the molding machine may be configurable to form panels of various sizes. Next, one of the sheets of thermoplastic is drawn into the lower mold by a vacuum. For the front panel 12, the process continues by inserting the reinforcement 21 into the sheet of thermoplastic drawn into the lower mold. The other sheet of thermoplastic is drawn into the upper mold by a vacuum. The two molds then close to shape the panel, and pressure is applied to seal the two sheets at the edges and other locations, such as the areas adjacent to the vent openings of the sliding vents. For the front panel 12, the application of pressure also locks the reinforcement 21 in place inside the front panel 12. The twin-sheet thermoforming process results in a shaped part that is hollow and double-walled with varying distance between the two walls.

The blow molding process for forming the panels according the present invention is as follows. First, a piece of plastic tube stock, called a parison, is extruded into a vertical standing open molding machine. The molds themselves may be identical to those used for the twin-sheet thermoforming process. In addition, extrusion of the parison heats the plastic so it is easily deformed in later steps. Next, a parison stretcher is used to stretch the parison beyond the edges of the mold. The hollow interior of the parison is then pressurized to force the plastic into the surrounding molds. The blow molding process essentially provides the same shaped part as the twin-sheet thermoforming process. However, inserting the reinforcement during the blow molding process is not practical.

Both of the processes described above require that scrap material is removed from the perimeter of the shaped part. This can be done by many methods known in the art, such as using a hand router to trim the scrap material.

The rotational molding process for forming the panels according the present invention is as follows. First, plastic resin material is placed in a mold. The mold is then simultaneously heated and slowly rotated about both the vertical and horizontal axes. This step distributes the resin material on the inner surfaces of the mold and causes the resin material to fuse. The rotational molding process essentially provides the same shaped part as the twin-sheet thermoforming and the blow molding processes. However, inserting the reinforcement during the rotational molding process is not practical.

As mentioned previously, use of the reinforcement 21 is advantageous since it prevents the door frame 20 from deforming while cooling after the thermoforming process. That is, after the thermoforming process the plastic door frame 20 attempts to shrink as it cools. However, the door frame 20 cannot shrink since the reinforcement is locked in place between sealed edges 33 and bosses 35 molded into the door frame 20 as shown in FIG. 6. Alternatively, the door frame 20 may not include a reinforcement 21. However, such a door frame 20 may shrink by about ⅝ inches and therefore including the reinforcement 21 is preferred. In addition, since the door frame 20 is not allowed to shrink, the material at the threshold of the door frame 20 is subjected to large shrinkage stresses. If the threshold of the door frame is flat, these shrinkage stresses may cause the threshold to tear. Therefore, the accordion-like structure 31 is included on the threshold of the door frame 20. The accordion-like structure 31 prevents the bottom threshold of the door frame 20 from tearing while cooling. Instead, the accordion-like structure 31 is permitted to stretch and relieve shrinkage stresses.

As most easily understood from FIG. 22, the door frame 20 and the door 18 of the front panel 12 are preferably formed as a single piece prior to being cut apart. Forming these components in such a manner reduces the amount of material wasted in the molding process. The door 18 is formed in a position wherein the knuckles 32 are formed in a space between the knuckles 28 on the door frame 20. However, the door 18 is positioned upwardly whereby the knuckles 32 are one space higher relative to the bottom of the door frame 20 than the post-separation assembled position of the door 18 (FIG. 2). As shown in FIG. 22, use of the hand router results in space between the knuckles 28 and 32. Therefore, if the size of the knuckles on either the door 18 or the door frame 20 is identical, the door 18 will be permitted to shift up and down along the hinge axis 30. For this reason, the size of the knuckles 32 on the door 18 increases from the bottom of the door 18 to the top. This provides little space between the knuckles 28 and 32 when the door 18 is in the post-separation assembled position (FIG. 2) and prevents the door 18 from shifting up and down along the hinge axis 30. In addition, this manufacturing technique permits the stops 22 and 24 on the door frame 20 and the hand grip 49 on the door 18 to be formed without wasting an excessive amount of material.

Figure 23:
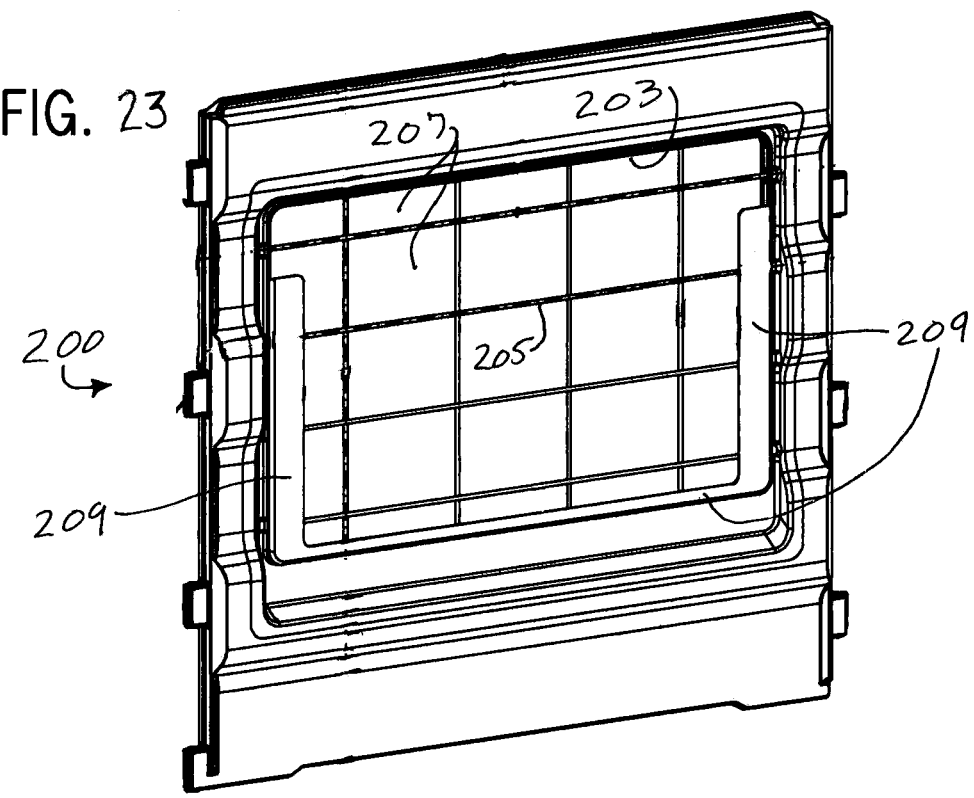
FIG. 23 is a perspective view of an alternative rear panel for the livestock confinement system having a large opening in the panel subdivided by a metal grate that is molded into the panel.
Figure 24:
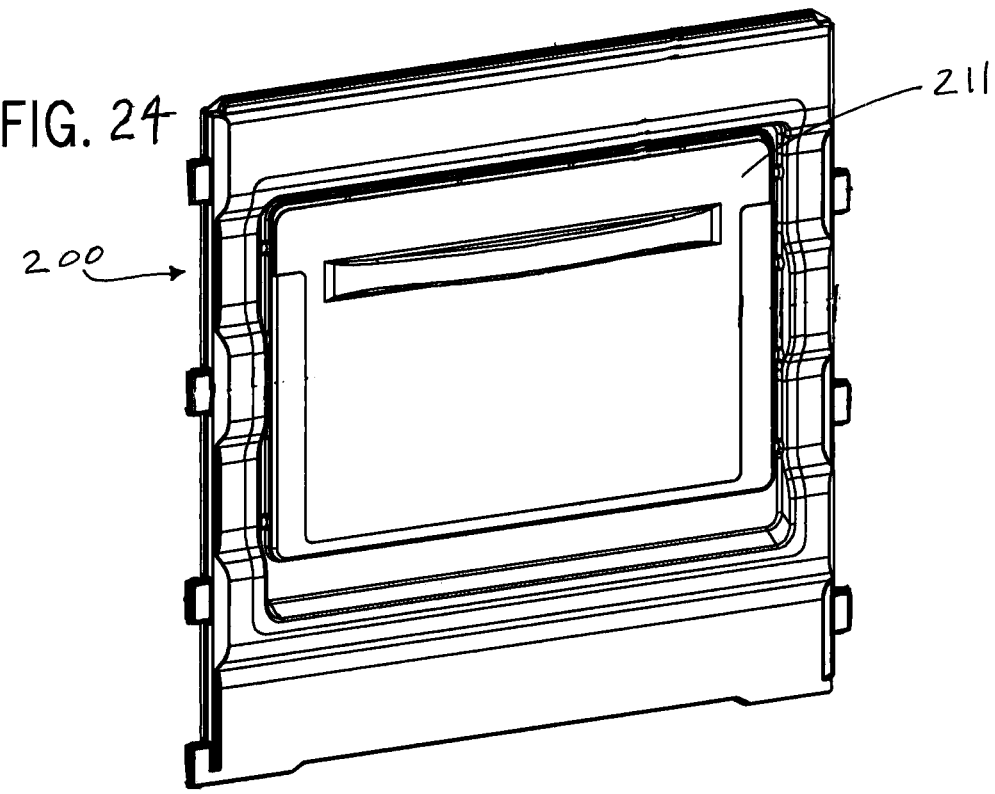
FIG. 24 is a perspective view of the rear panel of FIG. 23 with a cover installed over the opening.

Referring to FIGS. 23 and 24, an alternative side or rear panel for the pen system described herein is illustrated. This is disclosed in U.S. Patent Application Publication No. US2013/0081575A1 published Apr. 4, 2013, which is hereby incorporated by reference for all purposes and is the publication of U.S. patent application Ser. No. 13/633,499, referred to in the priority claim of this application. That application discloses a wall panel 200 as illustrated in FIGS. 23 and 24 for a pen system as described above that separates two pen spaces, and may be positioned on one or more sides or a rear of a pen. It would not be on the front because the door panel is on the front and it is a human space outside of the door panel, not a pen space. The subject wall panel has an opening 203 sufficiently large to provide visual and tactile contact between animals on opposite sides of the wall opening and the opening is restricted by being divided into smaller sub-openings by a divider 205 that is a grate made of interconnected bars that divide the larger opening 203 in the panel into smaller openings 207 through which the animals in adjacent pens can make physical contact but still be restrained in their respective pens. The divider 205 has bars that restrict passage through the overall opening 203 and are fixed to the wall panel 200 by the bars extending into the wall panel at edges of the wall panel that define the opening. The divider 205 is inserted between two plastic panels that make up the opposite sides of the wall panel 200 so that is it captured against movement between the two plastic panels that make up the wall panel. Flanges 209 partially overlap edges of the opening 203 so as to receive a cover 211 in a sliding fit between the flanges 209 and the divider 205 so as to at least partially block the opening when desired, so as to block contact between the animals or block drafts. The panel 200 comprises two plastic sheets fused together and the flanges 209 may be formed from one of the sheets and the cover may be formed from the other of the sheets. The sheets are molded under vacuum to have pockets that receive ends of the bars of the divider that extend through the pockets. The pockets are wider than the ends of the bars and the sheets are fused to one another at sides of the pockets along side the ends of the bars.

From the previous discussion, it should be apparent that the arrangements of pens and individual pens are freestanding. That is, no fasteners are required to fix the arrangements of pens and individual pens to a larger structure.

In addition, the embodiments described herein are most suited to dairy calves, particularly from birth until weaning. However, those skilled in the art will recognize changes to these embodiments that may provide a suitable confinement system for other animals, such as sheep, goats, exotic animals, and fowl. Such changes include modifications to the size of the panels and modifications that facilitate alternative feeding options.

A preferred embodiment of the invention has been described in considerable detail. Although some attention was given to various alternatives within the scope of the invention, it is anticipated that one skilled in the art will likely realize alternatives that are now apparent from disclosure of embodiments of the invention. Accordingly, the scope of the invention should be determined from the following claims and not limited by the above disclosure.

We claim:

1. A livestock confinement pen system comprising:
a first pen including a first rear panel formed from a first inner sheet and a first outer sheet, the first rear panel including a first vent opening through both the first inner sheet and the first outer sheet, and a first vent supported by the first rear panel and moveable to selectively cover the first vent opening;

a second pen including a second rear panel spaced apart from the first rear panel and formed from a second inner sheet and a second outer sheet, the second rear panel including a second vent opening through both the second inner sheet and the second outer sheet, and a second vent supported by the second rear panel and moveable to selectively cover the second vent opening;

a top attachment panel extending between and connecting an upper portion of the first rear panel and an upper portion of the second rear panel;

a left side attachment panel extending between and connecting a left portion of the first rear panel and a right portion of the second rear panel;

a right side attachment panel extending between and connecting a right portion of the first rear panel and a left portion of the second rear panel;

an air plenum defined between the first rear panel, the second rear panel, the top attachment panel, the left side attachment panel, and the right side attachment panel;

an opening in at least one of the top attachment panel, the left side attachment panel, and the right side attachment panel connected to a duct;

wherein when the first vent opening is unobstructed by the first vent a first air can be drawn from a first confinement area of the first pen through the first vent opening, into the air plenum, and through the duct; and wherein when the second vent opening is unobstructed by the second vent a second air can be drawn from a second confinement area of the second pen through the second vent opening, into the air plenum, and through the duct.

2. The livestock confinement pen system of claim 1, further comprising a first plurality of holes formed through the first inner sheet of the first rear panel, wherein the first plurality of holes open downwardly away from the upper portion of the first rear panel.

3. The livestock confinement pen system of claim 1, further comprising a first plurality of rear tabs that extend from the left portion of the first rear panel, where the first plurality of rear tabs define first openings that allow the first air to be drawn from the first confinement area through the first openings, into the air plenum, and through the duct.

4. The livestock confinement pen system of claim 1, further comprising an intermediate attachment panel positioned between the left side attachment panel and the right side attachment panel sectioning the air plenum into a left section and a right section, the intermediate attachment panel defining a plurality of holes to permit airflow between the left section and the right section.

5. The livestock confinement pen system of claim 1, wherein:

the first vent is slideably moveable to selectively cover the first vent opening; and the second vent is slideably moveable to selectively cover the second vent opening.

* * * * *